March 5, 1957 R. SCHILLING ET AL 2,783,612
PROCESS AND APPARATUS FOR GENERATING DRIVING GASES
Filed Dec. 24, 1951 3 Sheets-Sheet 1

INVENTORS.
Rudolph Schilling
August H. Schilling
BY
ATTORNEY

March 5, 1957  R. SCHILLING ET AL  2,783,612
PROCESS AND APPARATUS FOR GENERATING DRIVING GASES
Filed Dec. 24, 1951  3 Sheets-Sheet 2

*INVENTORS.*
Rudolph Schilling
August H. Schilling
BY *Joseph Hirschman*
ATTORNEY March 5, 1957 R. SCHILLING ET AL 2,783,612
PROCESS AND APPARATUS FOR GENERATING DRIVING GASES
Filed Dec. 24, 1951 3 Sheets-Sheet 3

INVENTORS.
Rudolph Schilling
August H. Schilling
BY
ATTORNEY

United States Patent Office 2,783,612
Patented Mar. 5, 1957

2,783,612

PROCESS AND APPARATUS FOR GENERATING DRIVING GASES

Rudolph Schilling, San Francisco, and August H. Schilling, Atherton, Calif., assignors to Schilling Estate Company, San Francisco, Calif.

Application December 24, 1951, Serial No. 263,115

25 Claims. (Cl. 60—39.02)

The present invention relates to a process for generating driving combustion gases by explosion and to apparatus for carrying out the process.

More particularly, the present invention relates to a process and apparatus for producing partially de-energized explosion gases of elevated pressure capable of further use, as in turbines, piston engines and the like, after the original explosion gases have been partially utilized in two or more turbine stages wherein, despite the fluctuations in the pressure of the gases discharging from the constant volume explosion chambers in which the gases are generated, they are utilized with substantially constant energy drop, so that maximum turbine rotor efficiency is secured.

The present invention has for its general object to control the counterpressures which are periodically built up behind each of the turbine rotors and in such manner that the aforementioned constant energy drop in the respective turbines is attained, and to provide an improved process and apparatus whereby such results are reliably secured.

More specifically, it is an object of the present invention to provide measures and means for promoting the rapid building up of the pressure behind each of the turbine stages and particularly in the first turbine stage, so that the ensuing expansion line of the counterpressure, that is, the counterpressure drop, falls in the Q—V diagram (as defined hereinafter) substantially parallel or equidistant with respect to the expansion line in the preceding stage, and for as nearly the whole period of such latter expansion as possible.

It is a further object of the invention to provide a process for the operation of multi-stage explosion plants wherein there is maintained in a gas collector chamber behind the first turbine stage a pressure which is considerably higher than the charging pressure of the air fed to the explosion chambers; it is also an object of the invention to provide an explosion turbine plant wherein live explosion gases of an intermediate pressure are discharged in succession from each of the explosion chambers into a space wherein there is built up a counterpressure for the first explosion turbine stage, as by discharging such gases into a collector of constant but small volume or into the rotor space of the subsequent stage.

Among the other objects of the invention are to provide a nozzle arrangement such that the rotor of the second stage is continuously impinged by a single nozzle assembly so that the second rotor can be screened over a large part of its circumference to reduce ventilation losses; to provide an arrangement whereby only a single collector chamber can be utilized effectively with a plurality of explosion chambers; to provide a process wherein live explosion gases of intermediate pressure are charged directly into a turbine of a stage lower than the first; to provide a process wherein the residual combustion gases of the chambers are discharged into the exhaust housing of the plant at a pressure substantially equal to that of the charging air but higher than that at which the gases are withdrawn for further use, so that there occurs in such exhaust space a periodically rapid rise in pressure followed by a gradual drop corresponding to the pressure drop in the preceding turbine stage.

Other objects and advantages of the invention will appear as the following detailed description of the invention proceeds.

As described in the co-pending application of August H. Schilling, entitled "Apparatus for the Generation of Driving Gases by Explosion and Process for Operating Same," Serial No. 263,113, filed of even date herewith, the efficiency of explosion turbine plants, particularly those employed as driving gas generators for producing combustion gases by explosions with utilization of the combustion gas drop in nozzle and blading systems, can be considerably improved over prior proposals and constructions, by providing for constant or practically constant combustion gas drops in the nozzle and blading systems of such driving gas generators. This has been attained primarily by causing the counterpressures prevailing behind the bladings, viewed in the direction of gas flow, to fall, deliberately and plannedly, according to a similar and synchronous characteristic (in the Q—V diagram) during the whole of, or approximately during the whole of (that is, simultaneously or approximately simultaneously with) the period of expansion of the combustion gases in the anteriorly arranged nozzle and blading system. To produce this deliberate and periodic drop in the counterpressure, the gases producing the counterpressures can be caused to expand during the expansion of the combustion gases in the anteriorly arranged nozzle and blading system in spaces behind the latter, whereby the stated conditions were satisfied. Also other measures of this type operated in the final analysis to effect this type of pressure drop. However, the counterpressures were in these cases not directly influenced but there was utilized, for example, the possibility of varying the flow-off cross-section of the gases leaving the blading, in relation to the cross-section of the nozzle arrangement discharging into the blading during the interval of the gas expansion, in such manner that the counterpressure which set in pursued a course synchronously to the expansion of the gases in the nozzle and blading system and thereby assumed approximately a similar characteristic to the expansion itself, whereby uniform or practically uniform combustion gas drops could be assured in the nozzle and blading system.

The present invention is based on the discovery that it is not necessary to employ control devices of the type referred to which are comparatively complicated and can lead to difficulties in operation. The process of the present invention for the operation of generators for producing combustion gases by explosion with utilization of gas drops in nozzle and blading systems, is accordingly characterized by the fact that the combustion gases discharging from the blading system are conducted to a collector arrangement which is of constant volume during operation and whose internal pressures, acting as counterpressures for the anteriorly arranged blading system, fall substantially concurrent with the expansion of the combustion gases in such anterior nozzle and blading system. In particular, our improved arrangement makes it possible to cause the internal pressure created in the collector space to fall along a line which runs equidistant to the expansion line or approximately so when such lines are represented in a Q—V diagram whose ordinates correspond to the heat content of the combustion gases in kcal./nm.$^3$ (enthalpy) and whose abscissae correspond to the percentage volume V of the outflowing combustion gases to the total gas volume generated in each explosion chamber. Our researches have shown that by suitably dimensioning the volume of the collector space the filling phase of such collector space can be favorably influenced, within which phase certain deviations between the expansion and counterpressure lines in the Q—V diagram can be observed. However, the process can be so conducted that the deviations between the expansion and counterpressure lines can be reduced and thereby the filling losses diminished.

One of the important features of the present invention resides in the manner in which the gases discharging from the blading system are conducted into the collector space in which the controlled counterpressure is generated, such that as little energy loss as possible occurs. It will be manifest that transfer losses of any considerable magnitude can prejudice the advantages which accrue from the proper control of the course of the counterpressure.

In order to reduce the transfer losses as much as possible the combustion gases are conducted to the collector space by way of catch nozzles which are fitted as far as possible with respect to their arrangement and construction, to the condition of the gases discharging from the blading. The invention contemplates a number of possibilities for achieving this end, as will be described hereinafter.

Within the frame of an explosion turbine plant there is present the possibility of generating by explosion the gases required for the build-up of pressure in the collecting space prior to each expansion, and to utilize for this purpose the same explosion chambers whose higher pressure gas portions are expanded in the nozzle and blading systems with the delivery of work. The counterpressure which is to be periodically reduced can first of all be generated inside the collector space itself. There exists, however, also the possibility of generating this counterpressure, by way of a nozzle arrangement in the housing space of a subsequent blading system attached to the collector space, since the rotor space is connected directly to such collector space by way of the interposed nozzle arrangement, so that internal pressures arising in the rotor chamber become effective in the collector space in approximately the same manner, that is, synchronously and with similar characteristic. This is of importance for the attachment of the explosion chambers in which the combustion gas portions of intermediate pressure utilized for producing the internal pressure are generated, while other, higher pressure combustion gas portions are brought into action in anteriorly arranged nozzle and blading systems. In the first case the production of the internal pressure drop in the collector space occurs directly by means of the pressure gases brought thereinto for expansion, particularly of combustion gases withdrawn from one or a plurality of explosion chambers, such withdrawal taking place at an instant in which a combustion gas pressure appears in the chamber or chambers which more or less coincides with the pressure which the gases exhibit at the end of their expansion in the nozzle or blading arrangement. Thereby there arises above all the advantage that simultaneously with the inflow of combustion gases, which have been partially expanded in the preceding nozzle and blading system, the collector space arrangement receives fresh gases directly from the explosion chambers which, as will be shown in connection with the diagrams discussed below, are in very considerable amounts, so that the filling phase is much reduced in time and the line of the internal pressure of the collector space assumes to a higher degree the desired characteristic, namely, a parallel course to the expansion line in the Q—V diagram, than would be the case without this feature of the present invention. In the second case, on the other hand, the production of the internal pressure drop occurs in the housing space and hence indirectly in the collector space arrangement in advance of the same by means of pressure gases expanded in the housing space by way of a nozzle assembly, particularly withdrawn from one or more explosion chambers which again are withdrawn at an instant in which there appears in the chamber or chambers a gas pressure which substantially coincides with the pressure which the gases have at the end of their expansion in the preceding blading system. Finally, both procedures can be carried out by charging the live gases of intermediate pressure from the explosion chambers both to the collecting space itself as well as to the rotor space of the nozzle and blading system following the collector space in the direction of gas flow by way of suitably arranged and constructed nozzles. In all cases the advantages explained in connection with the first process are obtained.

The devices for carrying out this process and embodied in the apparatus can have various constructions. They are, however, characterized fundamentally by the arrangement of a collector chamber whose internal volume remains constant during operation, in combination with means for producing a falling internal pressure in such collector chamber concurrently, or essentially concurrently with the expansion of the combustion gases in the anterior nozzle and blading system. We have found that the ratio of the volume of the collector chamber or chambers to the volume of the explosion chambers operating on such collector arrangement has an important influence upon the favorable course of the collector filling phase. Thus, in the case of an arrangement of two nozzle and blading units, i. e. of two turbine stages, there must be given to the collector chamber arrangement between these units or stages a volume which is less than 10% of the volume of all of the explosion chambers operating on such collector arrangement, and preferably in the range from 1 to 5% of the total chamber volume, in order to obtain satisfactory results. The volume of the collector chamber is to be understood as consisting only of the space in the collector chamber between the throat of the catch nozzle at one end of the chamber and the throat of the outlet nozzle at the other end, and excludes the volume of the passageways leading to the collector chamber from the several explosion chambers.

Further objects and advantages of the present invention will appear from the following more detailed description taken in connection with the accompanying drawings in which there is shown by way of example an oil-operated driving gas generator in the form of a two-stage explosion turbine plant with four explosion chambers. In said drawings.

Fig. 6 presents the pressure-time diagram of the explosion chambers of the driving gas generator according to Fig. 2; while Fig. 7 shows a Q—V diagram of the plant according to Figs. 1 to 3.

Figure 1:
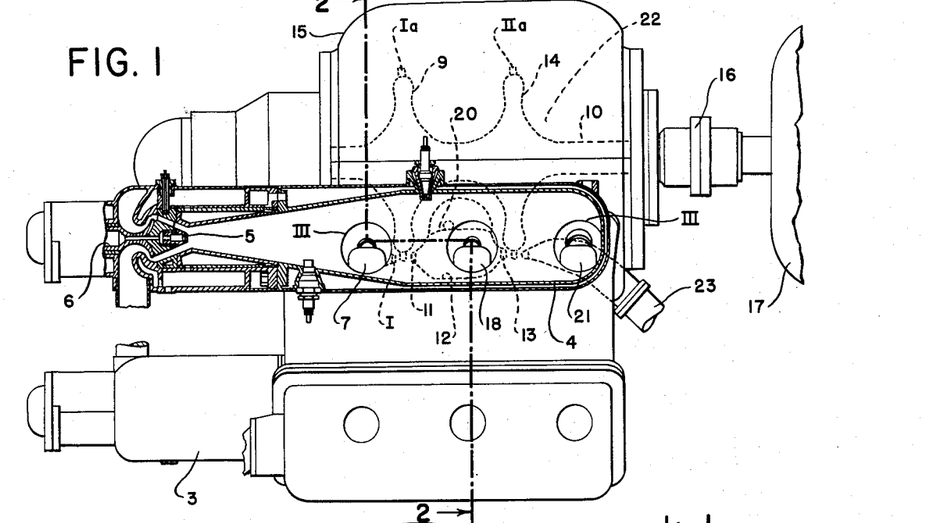
Fig. 1 shows the driving gas generator in side elevation, the same being partly in section along the line I—I of Fig. 2 and showing an explosion chamber in longitudinal section.
Figure 2:
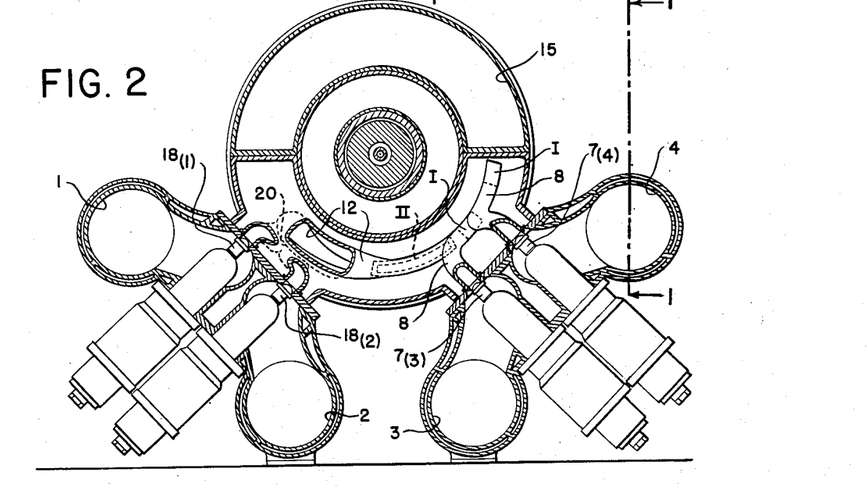
Fig. 2 is a vertical section through the generator along the line II—II of Fig. 1.

Referring to the drawings, and particularly to Figs. 1 and 2, the numerals 1, 2, 3, and 4 indicate the explosion chambers, the chamber 4 being shown in Fig. 1 in longitudinal section while chamber 3 is shown in elevation. Each chamber is provided with an air charging valve 5 which is indicated schematically at the left end of chamber 4. A liquid fuel injection valve is built into the head of the air charging valve, the same being supplied by a fuel conduit 6 which runs from a fuel pump of known construction (not shown). The chambers are also provided with igniting devices of known type, which are likewise not shown.

As can be seen from Figs. 1 and 2, each explosion chamber is provided with a series of discharge members or valves which are distributed along its length. Reference is had first of all to the nozzle valve 7 in each chamber for the explosion gas portion of highest pressure generated in each explosion, and which upon opening discharges the gases into the nozzles I by way of the nozzle pre-chambers 8. The gas portions of maximum pressure conducted to the nozzles I are directed against the blading Ia arranged on the first wheel 9 of the turbine rotor 10. Catch nozzles 11 are arranged to receive the gases which have been partially expanded in the first turbine stage Ia, 9 and are fitted to the condition of this gas portion which was originally of the highest pressure. To the catch nozzle assembly 11 is connected the collecting chamber arrangement 12 which, at its end opposite to the catch nozzle assembly 11, passes over into a further nozzle assembly 13 which is associated with the blading IIa of a second wheel 14 of the combined rotor 10. The rotor 10 runs in the turbine housing 15. The mechanical energy of the rotor 10 is delivered by way of a coupling 16 to a work absorbing machine 17 which can, for example, be a compressor for producing the compressed charging air.

Aside from the nozzle valve 7 which serves for charging the nozzles I, each chamber is provided with a further nozzle valve 18 for the discharge of a combustion gas portion of lower pressure from the chambers 1 to 4. In the form of the invention illustrated, the spaces 19, 20, disposed behind the seats of the nozzle valves 18, in the direction of flow of the gases, are in direct communication with the collecting chamber 12. The spaces 19 are presented by conduits which receive the lower pressure combustion gas portion from a group of two nozzle valves 18 disposed adjacent to each other. Such a group conduit 19 is shown at the left half of Fig. 2 only for the nozzle valves 18 of the two explosion chambers 1 and 2. The group conduit 19 leads the combustion gas portions of lower pressure to the collecting chamber 12 by way of the common elbow 20. A corresponding group conduit 19 is provided for the explosion chambers 3, 4, but is not seen in the drawing because the right half of Fig. 2 shows a section through the nozzle valves 7 and the parts associated therewith in the first turbine stage.

For discharge of the lowest pressure combustion gas portions there are provided discharge members in the form of outlet valves 21 which are constructed similarly to the valves 7 and 18 but have larger cross-sections. These lowest pressure combustion gas portions consist of residual combustion gases which, according to the preferred method of charging the chambers, are displaced out of the explosion chambers by the incoming charging air as soon as the air valves 5 are opened. The combustion gases expelled from the explosion chambers through the valves 21 flow to the exhaust housing 22 forming part of the turbine housing 15, the details of this construction not being shown as the present invention is not concerned therewith. The outflowing gases which are thus under a pressure corresponding to that of the charging air are withdrawn as driving gases by the withdrawal conduit 23 and conducted to a place of further use.

The nozzle assembly 13, which is associated with the wheel IIa of the second turbine stage, conducts combustion gases from two different sources to the second turbine stage IIa, 14. First of all it utilizes the combustion gases which, as the explosion gas portions of maximum pressure, were discharged from the explosion chambers by way of the nozzle valves 7 and were partially de-energized in the first turbine stage Ia, 9. Secondly, it utilizes also the combustion gases which were discharged by way of the nozzle valves 18 directly from the explosion chambers as the lower or intermediate pressure combustion gas portions by way of the conduits 19, 20 into the collecting chamber arrangement 12. The nozzle assembly 13 can therefore be designated also as nozzle assembly II for the second turbine stage as it is assigned as the single nozzle assembly for the wheel IIa, 14.

Figure 3:
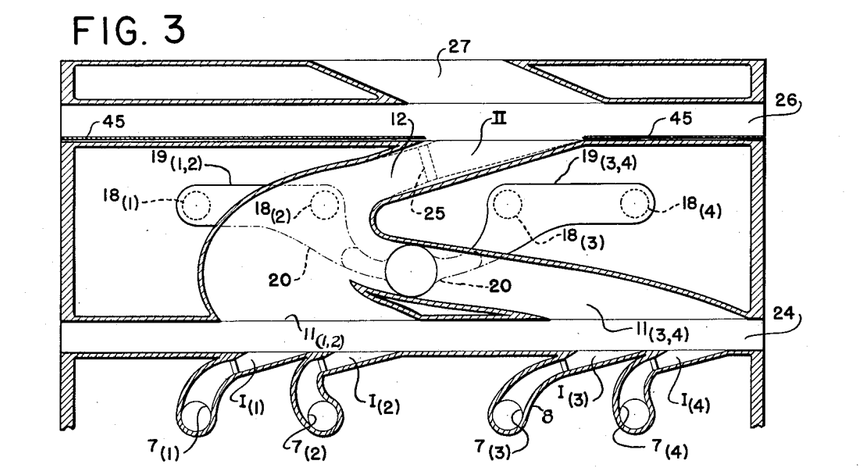
Fig. 3 shows on an enlarged scale a circumferential section along the periphery, and is taken along the line III—III of Fig. 1.

Certain of the parts above described can be better seen in Fig. 3. There are shown first of all the nozzle valves 7, the chambers to which the individual valves belong being indicated by subscript numerals in parentheses. There are shown also in such figure the nozzle pre-chambers 8 of the nozzles I. It will be seen that for each explosion chamber there is provided a separate individual nozzle I. The invention, however, is not restricted to this construction, as can be seen from Figs. 4 and 5; the nozzle pre-chambers 8 and in corresponding fashion also the nozzles I could be united into nozzle groups or even into a general nozzle. Controlling for the choice of the one or the other arrangement is the selected method of operation, whose influence especially on the nozzle II will be explained more in detail hereinbelow.

There will be seen also in Fig. 3 the rotor chamber 24 of the first turbine stage in which the rotor 9 rotates.

In contrast to the individual nozzle arrangement I, the practical realization of a further feature of the invention, namely, the device serving for carrying out the catch process, shows that a group-like combination can here be utilized. According to the invention, there are provided two catch nozzle groups $11_{(1,2)}$ and $11_{(3,4)}$, the catch nozzle arrangement $11_{(1,2)}$ being assigned to the nozzles $I_{(1)}$ and $I_{(2)}$ and the catch nozzle arrangement $11_{(3,4)}$ to the nozzles $I_{(3)}$ and $I_{(4)}$. Both catch nozzle arrangements, however, operate upon a single collector chamber 12 which at the end opposite to the catch nozzle arrangement 11 is shaped to form the nozzle II. The single collector chamber thereby produced is connected by way of conduit 20 with the spaces $19_{(1,2)}$ and $19_{(3,4)}$, the space $19_{(1,2)}$ being constructed as a group conduit for the combustion gas portions of lower pressure which are discharged by way of the nozzle valves 18 of chambers 1 and 2, while space $19_{(3,4)}$ is constructed as a group conduit for the lower pressure combustion gas portions which are discharged by way of the nozzle valves 18 of the chambers 3 and 4. The group conduits $19_{(1,2)}$ and $19_{(3,4)}$ become united at 20 as they open into the collector chamber 12. As the nozzle arrangement II is attached at its narrowest cross-section 25, or the collector chamber 12 passes over into this nozzle arrangement II characterized by a narrowest cross-section (throat) and subsequent widening as well as extension, the nozzle arrangement II operates with the combustion gas portions which were partially expanded in the turbine stage Ia, 9 (Fig. 1), or more exactly, in the nozzle arrangement $I_{(1)}$, $I_{(2)}$, $I_{(3)}$, $I_{(4)}$, 9, 24 (Fig. 3), as well as the combustion gas portions of originally lower pressure which were conducted to the collector chamber 12 by way of the nozzle valves 18 of chambers 1, 2, 3, and 4, and conduits 19, 20.

To the nozzle arrangement II there is connected the rotor chamber space 26 of the second turbine stage IIa, 14, viewed in the direction of gas flow. After the combustion gases which have been caused to impinge the rotor through the nozzle arrangement II have performed further work in such turbine stage IIa, 14, 26, they flow by way of a catch nozzle 27 into the exhaust housing 22 with which the outlet valves 21 are connected and which upon opening discharge the residual combustion gases into such exhaust housing.

Figure 4:
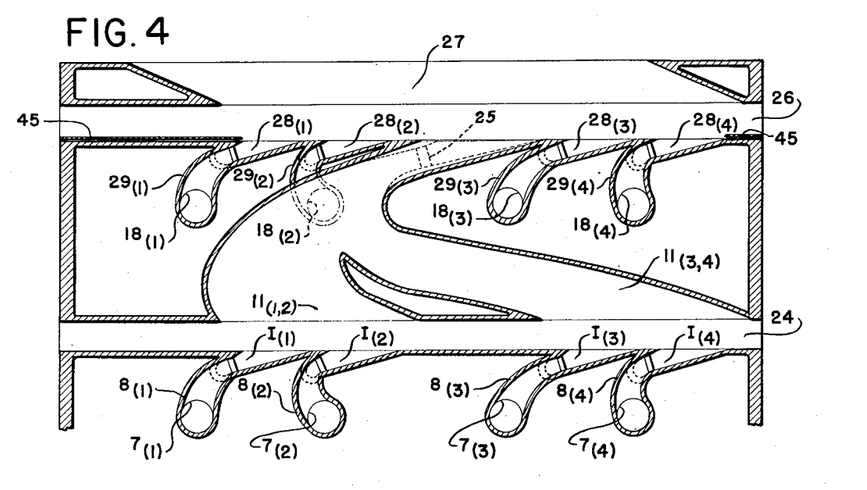
Fig. 4 shows a modification of the structure shown in Fig. 3.
Figure 5:
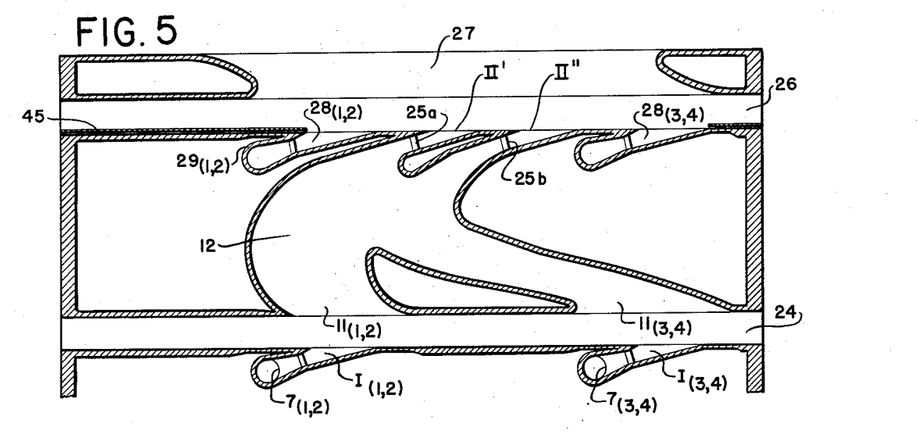
Fig. 5 shows a still further modification of the structure shown in Fig. 3.

Before describing the method of operation which appears clearly from the arrangement according to Figs. 1 to 3, there will first be described the further embodiments of the invention which are illustrated in Figs. 4 and 5. According to the constructional example of Fig. 4, the nozzle arrangement I is constructed in the same manner as in the example according to Fig. 3. Also the catch nozzle arrangement $11_{(1,2)}$ and $11_{(3,4)}$ is no different from that shown in Fig. 3. This applies also to the collector chamber arrangement 12. However, the constructions differ in respect of the conduction of the lower pressure combustion gas portions discharged by way of the nozzle valves 18 of the four chambers, which gas portions, in contrast to the construction of Fig. 3, are conducted directly to the rotor chamber space 26 of the second turbine stage IIa, 14 (Fig. 1) by way of individual nozzles, namely the nozzles $28_{(1)}$ to $28_{(4)}$. Thereby the deliberate reduction of the pressure of the lower pressure combustion gas portions no longer occurs, as in Fig. 3, directly in the collector chamber 12 for producing therein an inner pressure course which, viewed diagrammatically, is to be equidistant as a counterpressure line with respect to the expansion line of the nozzle arrangement I, 9, 24, but such reduction in pressure now takes place directly in the rotor chamber space 26, and in view of the continuously open connection of the nozzle arrangement II between the spaces 12 and 26, it comes into operation in the same way in collector chamber 12; in other words Fig. 4 illustrates a constructional example which corresponds to the second alternative process described hereinabove. The third possibility can also be easily realized, namely the carrying out together of both alternative processes, in that one part of the combustion gas conduits $29_{(1)}$ to $29_{(4)}$ to the nozzles 28 is allowed to debouch into the collector chamber 12 in the manner described in connection with Fig. 3, while another portion is allowed to open into the rotor chamber 26. In this case, the nozzle arrangement II takes over the function of the nozzles $28_{(1)}$ to $28_{(4)}$ which are associated with the combustion gas conduits $29_{(1)}$ to $29_{(4)}$ with direct opening into the rotor chamber 26. It depends again upon the selected method of operation whether the second alternative process of Fig. 4 or the not illustrated modification of a combination of both processes is employed.

In the constructional example according to Fig. 5, a group-like combination of nozzle valves $7_{(1,2)}$ and $7_{(3,4)}$ has been undertaken in nozzle arrangement I; in such construction, two group nozzles $I_{(1,2)}$ and $I_{(3,4)}$ are utilized.

A further group-like combination has been undertaken in the connection to the discharge members or nozzle valves 18; accordingly, two groups of supply conduits $29_{(1,2)}$ and $29_{(3,4)}$ and likewise of nozzles $28_{(1,2)}$ and $28_{(3,4)}$ are present. On the other hand, the common collector chamber 12 with two catch nozzle groups $11_{(1,2)}$ and $11_{(3,4)}$, as shown in Figs. 3 and 4, are retained. A modification is embodied in this form of the invention only to the extent that by incorporating a guide wall or plate 30, the main nozzle II has been divided into two nozzles II' and II''. In the same way, the nozzle arrangement II', II'' of Fig. 5 could be replaced by the main nozzle II of Figs. 3 and 4.

It was stated above that these deviations are not entirely a matter of free choice, but are conditioned at least in part by the nature of the working process, and this point will now be considered more in detail below.

Figures 6, 7:
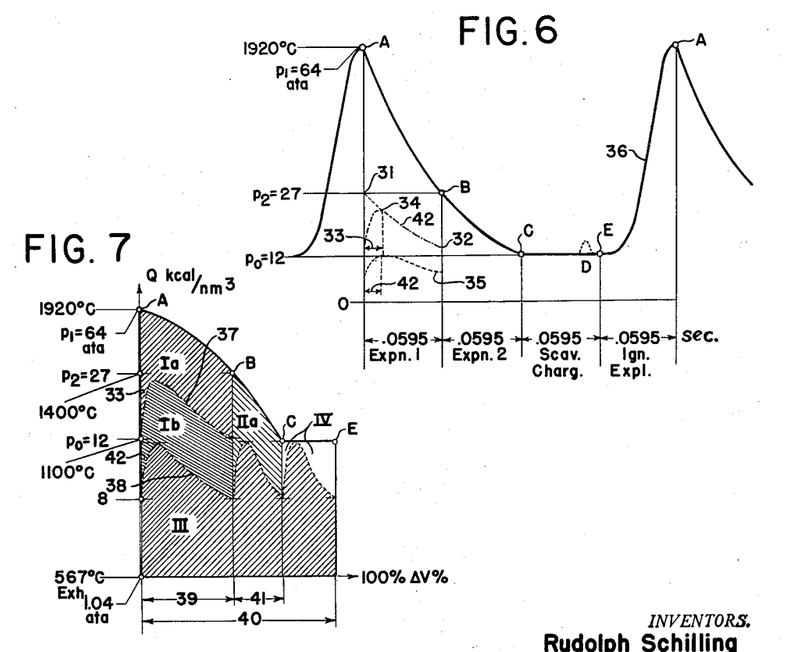

Fig. 6 shows the pressure-time diagram of one of the explosion chambers 1 to 4, shown in Fig. 2. There will first be recognized in the diagram the maximum explosion pressure $p_1$ which is shown as point A on an ordinate erected at the 0-point of the coordinate system. If the diagram of Fig. 6 is considered in connection with the explosion chamber 4 shown in section in Fig. 1, then the nozzle valve 7 opens at the point A under the action of a control mechanism which is indicated schematically in Fig. 2. At this instant, therefore, the highest pressure combustion gases are discharged, but only to the extent of a portion of the gases because the valve 7 closes at the point B of the expansion line of the total combustion gas mass of this explosion chamber 4. At this instant, the nozzle valve 18 opens and discharges from the same explosion chamber 4 combustion gases which are of a lower pressure, namely a pressure $p_2$, which is considerably lower than the pressure $p_1$. The gases discharging through the nozzle valve 18 are likewise only a portion of the total quantity of gases generated in each explosion and remaining in the chamber 4, because the nozzle valve 18 closes at the instant C. The expansion of the gases still in the explosion chamber has by now advanced to the extent that the residual gases have only the pressure $p_0$, that is the pressure of the charging air. At the point C, at which the nozzle valve 18 closes, the air charging valve 5 opens. At the same time, the outlet valve 21 is opened. As a result, the charging air at its charging pressure, pushes out the residual combustion gases which are still in the chamber at the instant C. This so-called residual combustion gas portion is thus displaced out of the chamber by the charging air during the time interval C—E, the valves 5 and 21 closing at the instant E. During the interval D, fuel has been admitted by way of the fuel conduit 6 into the forwardly moving body of air which has assumed the form of a piston. This method of charging, because of the open condition of the valves 5 and 21 during the admission of fuel, has been called the "open charging" process. It has the advantage of bringing about a thorough mixing of fuel and air particles and thus produces a homogeneous, highly ignitable charge and causes a powerful explosion with a steep course of the explosion line 36 following the ignition at the instant z.

During the time that the highest pressure combustion gas portion discharged from the explosion chamber 4 at the instant 0 or A was subjected to partial expansion in the nozzle and blading system I, 9 characterized by the line A—B, another of the four explosion chambers 1 to 4, for example the chamber 3, has reached a phase of its working cycle which is so displaced in time with respect to that of chamber 4 shown in Fig. 6, that the point B of the diagram belonging to this chamber 3, but not illustrated, has been reached at the instant that the diagram of Fig. 6 reached the point 0 of the time line of the abscissa axis; in other words, the working cycle of chamber 3 is advanced over that of Fig. 6 by the time interval A—B. Accordingly, the nozzle valve $18_{(3)}$ (see Fig. 3), has opened at the instant 0 of the diagram of Fig. 6 and has discharged a lower pressure gas portion, namely a portion whose initial pressure is $p_2$, in to the collector chamber 12. Since the nozzle valve $18_{(3)}$ is open during a period corresponding to the period B—C of the diagram of Fig. 6, then this lower pressure combustion gas portion is subjected to an expansion which according to the diagram of Fig. 6 begins at the instant 31 according to the dotted line and ends at 32, corresponding to the instant C of Fig. 6, which is advanced over the instant 32 by the time interval A—B.

The dot-and-dash line 42 of the inner pressure course in the collector chamber 12 agrees with the line 31, 32 except for slight deviations in the region of the filling phase 33 of the collector chamber 12; as this line 42 of the inner pressure in the collector chamber 12 represents nothing else than the course of the counterpressure appearing behind the blading Ia, 9, 24, leaving aside negligible flow resistances, then in the range 34 to 32 there occurs a complete equidistance of the line 42 to the expansion line A—B. This signifies that in the nozzle and blading system I, 9 practically uniform combustion gas enthalpy drops occur. The deviations appearing in the range 33 lie within the permissible tolerance of 45% of the optimum drop for single-ringed rotors, wherein the largest fluctuations upwardly are not to exceed 30% and downwardly are not to exceed 15%. This favorable result is attained by the combination of two features, the first being the comparatively small dimensions of the collector chamber 12 which can be recognized in the constructional example of Figs. 1 and 3. This small size of the collector chamber could be attained because in turn two favorable features have been realized. First of all, the two catch nozzles $11_{(1)}$ and $11_{(2)}$ have been united into a common group nozzle $11_{(1,2)}$ and the two following catch nozzles have similarly been combined into a group catch nozzle 11(3,4). There is further provided a single nozzle arrangement II for catching all the combustion gases which flow through a cross-section of the turbine (i. e., taken perpendicular to the turbine axis) in the position of nozzles II. In this way, it is possible to dispose the collector chamber 12 between the rotors 9 and 14 inside of the turbine housing without disturbing the turbine construction, and to determine its volume in such manner that it is less than 10% of the combined volume of all of the explosion chambers 1, 2, 3, and 4 which operate on this collector chamber 12 in succession according to the cyclic displacement of their working cycles, and preferably from 1 to 5% of such combined volume. This small collector chamber volume has, in addition to the advantages of favorably influencing the filling phase of such chamber, also the advantage that it brings about small outer surfaces for the chamber, so that the heat transfer at such chamber turns out correspondingly small.

As the second important feature, there is additionally present the fact that, as can be clearly seen from Q—V diagram of Fig. 7, the combustion gas portions discharged by the nozzle valve 18(3) (or by any of the other valves 18) represent a very considerable portion of the total gas quantity generated by an explosion in the explosion chamber, so that the collector chamber 12 fills up extremely rapidly. This occurs because it is fed with combustion gases from two sources; thus it receives by way of the catch nozzles 11(1,2) and 11(3,4) the combustion gas portions which were originally of highest pressure and have been partially utilized in the anteriorly arranged nozzle and blading system I, 9, 24, and it receives further, by way of the conduit 20, the lower pressure combustion gas portions by way of the nozzle valves 18, as of the just-considered nozzle valve 18(3). To these two circumstances the equidistant course of the counter-pressure line 42 with respect to the expansion line AB is to be traced.

For the sake of completeness, it may be mentioned that behind the nozzle and blading arrangement II, 14, that is, in the exhaust housing 22, a counterpressure course 35 occurs which is represented by the dotted line in Fig. 6. This pressure course is attained by the expulsion of the combustion gas portions during the time interval C to E of Fig. 6 for the chamber 4 under consideration insofar as the discharge of this combustion gas residue occurs through the open outlet valve 21 of such chamber. What has been said with reference to chamber 4 applies naturally for all the chambers, that is, also for the chambers 1, 2, and 3. This means that, independently of the explosion chamber which at any moment is discharging gas portions of higher, lower or lowest pressure, the nozzle and blading systems I, 9, 24 and I, 14, 26 convert practically uniform combustion gas drops since the expansion line section BC and the associated counterpressure line 35 also run essentially equidistantly. This counterpressure course in the exhaust housing 22 is associated with the expansion line section or short partial expansion BC of the diagram of Fig. 6 which is produced by the lowest pressure combustion gas portion of one of the explosion gas chambers 1 or 2, the beginning of whose working cycle is advanced with respect to the instant 0 of Fig. 6 by the time interval A to C to enable it to begin with the discharge of its residual gas portion into the exhaust housing 22 at the instant B of the diagram of such figure. By this practically uniform combustion gas enthalpy drop, which thus occurs in all turbine stages and is attainable in more than two turbine stages through similar measures, the strived-after high rotor efficiency is realized.

The Q—V diagram of Fig. 7 shows these relationships more clearly. In such diagram, which combines the usual Q—S (entropy) diagram, for example according to Pflaum, with the percentage of discharged combustion gas masses as abscissae, the total combustion gas quantity of each explosion chamber being considered as 100%, while the ordinates correspond to the heat content of the combustion gases in kcal./nm$^3$/(enthalpy), there will be recognized first of all the points A, B, C, and E of Fig. 7 corresponding to the points A, B, C and E of Fig. 6. The pressure and temperature line network is only indicated and applies only for the double line running from A which indicates the adiabatic combustion gas drop. There is shown further the dot-and-dash line 37 representing the counterpressure and corresponding to the line 42 of Fig. 6, and also the line 38 corresponding to the line 35 of Fig. 6. These lines, in combination with the ordinates running through the points A, B, C, and E determine the surfaces Ia, Ib, IIa and III.

The double line referred to in the preceding paragraph represents the changes of condition during the expansions. These changes appear in the Q—S diagram as vertical adiabatic lines, but only in the ideal machine, in which no change of entropy appears during the expansion, that is, no heat is lost to the walls and no heat is absorbed from the friction heat of the rotors and blades. In the practical machine, however, both of these phenomena occur. Careful investigations on the heat interchange at the walls on the part of the combustion gases, and calculations of the ventilation losses of the wheels and blades show that in carefully designed plants the methods of operation which from the practical standpoint come chiefly into consideration there is substantial equality between the heat delivered and the heat absorbed. It is, therefore, approximately correct to assume that the changes in combustion gas conditions during the expansions are adiabatic changes in condition also for the practical machine, and these appear in the Q—S diagram as vertical lines.

The surface Ia below the curve AB corresponding to the first partial expansion AB indicates the work output of the combustion gas portion discharging from the nozzle arrangement I and exerted upon the rotor 9. The dot-and-dash dividing line 37 corresponds to the internal pressure appearing in the collector chamber 12, and thus corresponds to the counterpressure with reference to the anteriorly aranged nozzle and blading system I, 9. The course of this line 37 is dependent mainly upon the number of working chambers, the number and size of the nozzle pre-chambers and the narrowest nozzle cross-sections, besides a series of influences which are difficult to determine by calculation and experiment. The nozzle cross-sections have been deliberately varied besides the already mentioned measurements of the collector chamber, in order to obtain favorable conditions. In this connection it was found that when only the gas portion of originally highest pressure is utilized in the nozzle arrangement II, its narrowest total cross-section $f_{II}$ in relation to the narrowest cross-section $f_I$ of the nozzle arrangement I must be kept within the limits of 1.5 to 2.5:1 in order to arrive at optimum values. The ratio $f_{II}$:$f_I$ is to be increased to 2.5 to 3.5:1 when the nozzle arrangement II, according to the constructional example illustrated, is to utilize not only the originally highest pressure combustion gas portion conducted by way of the nozzle arrangement I, but also the lower pressure combustion gas portions directly withdrawn from the explosion chambers by way of the members 18, 12, and 20. By reason of the favorable shape of the curves 37 and naturally also 38 in the Q—V diagram to be attained in this way, the rotor efficiency of the turbines is raised in the optimum manner because the equidistance of the lines AB, 37 and 38 which is essentially achieved shows that the desired uniform combustion gas drops in the turbine stages I, 9 and I, 14 have been successfully realized.

The reference character Ib designates the surface which corresponds to the work yielded by the combustion gas portion delivered by way of the nozzle I in the nozzle and blading system II, 20. We are thus here dealing with the work output of that part of the combustion gas quantity which has already performed work in the first turbine stage I, 9 and yields further work in the second turbine stage.

The working area IIa corresponds to the available work which the lower pressure combustion gas portions which are discharged from the explosion chambers through the nozzle valves 18, deliver in the second turbine stage.

Finally, the reference character III indicates the working capacity which the combustion gases flowing off through the driving gas conduit 23 still possess.

Fig. 7, when taken together with the constructional embodiment schematically shown in Figs. 1 and 2, makes plain the features of the present invention, which have led to the considerable advance so attained, and which is indicated by the fact that pursuant to the practically uniform drops in the turbine stages, the rotors or rotor groups which are suited most completely to these conditions have been made usable with the highest efficiency, so that in consequence an explosion turbine can in accordance with the invention be constructed which is the equal of steam or uniform pressure turbines with reference to the conditions of impingement, but which in contrast to these possesses the fundamental advantage of thermodynamically highest value. The Q—V diagram shows first of all what considerable combustion gas quantities are available for filling the collector chamber. As already pointed out above, the collector chamber 12 in the constructional examples according to Figs. 1 to 3, to which the diagram of Fig. 7 belongs, is simultaneously filled with combustion gases from two sources, first by the combustion gas portion to the extent 39 in relation to the combustion gas total quantity 40, by way of the anteriorly arranged nozzle and blading system 1, 9, and further by the combustion gas portion of the extent 41 in relation to the combustion gas total quantity 40 by way of the conduits 18, 19 and 20. This results in a flow of large combustion gas masses into the chamber 12 and thus to an extremely rapid filling of the same, so that the wedge 33 in which deviations in the equidistance between the lines AB and 37 occur, disappears or almost disappears; the counterpressure line 37 is thereby brought into the relative position with reference to the expansion line section AB even with smaller discharged combustion gas volumes. The same is true for counterpressure lines 38 and wedge 42 correspondingly. In the example illustrated, the portions 39 and 41 together amount to approximately 75% of the combustion gas quantity, about 25% belonging to the part 41. This approximately 75% of the combustion gases flows through the narrowest cross-section of the nozzle arrangement II with the smallest nozzle losses.

The above-mentioned influence of the working process on the constructional possibilities according to Figs. 3 to 5, briefly touched on above, will now be described more in detail.

Fig. 4 shows the general constructional example for nozzle II and nozzles 28. Should the pressure conditions of the combustion gases utilized in nozzles 28 be different from those utilized in nozzle II, this would be the correct constructional example. Four nozzles 28 are shown corresponding to four explosion chambers, but there is always only one in operation, through which the combustion gases actually flow. Therefore two nozzles 28 could be united into one as shown in Fig. 5, and there might even be united all four nozzles 28 into a single nozzle. If the single nozzle 28 is closely adjacent to nozzle II, say at its left side, then the side walls, separating the right side of this nozzle 28 from the left side of nozzle II could be kept so much the thinner the more it was possible to produce identity in the conditions of the gases flowing through the nozzle 28 and the nozzle II. If it were possible to bring those periodically fluctuating combustion gas conditions into coincidence, then the side walls between the single nozzle 28 and the nozzle II could disappear and nozzle 28 would be merely an extension of nozzle II.

By virtue of the possibility which we have discovered and is represented in Figs. 6 and 7, of bringing into coincidence the expansion line section BC in the explosion chambers with the expansion line 31—32 associated therewith, that is, of establishing identity between the conditions of the combustion gases flowing through the nozzle arrangements 28 and II of Fig. 4, it has become possible to attain this goal, and thus to arrive at the construction of Figs. 1 to 3 that is, to realize a total nozzle II in the second turbine stage and corresponding total nozzles when required in the further turbine stages. This nozzle construction has a series of important advantages. The nozzles 28 of Fig. 4 operate periodically, that is they receive combustion gases only during the time interval B to C of Fig. 6.

Nozzles with interrupted impingement, however, operate less favorably than nozzles impinged continuously. The nozzle II is such a continuously operating nozzle; for in advance of the same there is arranged a single collector chamber 12 which receives combustion gases uninterruptedly because the working cycles of chambers 1 to 4 can be suitably displaced in such a manner that one of the nozzles I of the chambers 1 to 4 always receives combustion gases. An arrangement according to Fig. 3, therefore, operates with higher nozzle efficiency than an arrangement according to Fig. 4 with the individual nozzles 28, or an arrangement according to Fig. 5 with the group nozzles 28 associated with chambers 1 and 2 or those associated with chambers 3 and 4. By reason of the pause-free sequential impingement by driving medium, the turbine rotors 9 and 14 receive in addition a very uniform torque. The degree of non-uniformity of the turbine rotor is expressed by the ratio $$(W_{max} - W_{min}) : W$$

This ratio is as low as 1:700 in a machine designed according to these principles, not considering the compressor driven by the explosion turbine. In previous machines, not following these principles, this ratio was 1:350, even if these machines had been provided with a so-called pressure equalizer in advance of wheel 14. This means that the degree of non-uniformity of the turbine rotor has been lowered to one half of the machines not using these principles.

In addition, the nozzle II of Fig. 3 leads to a single break-through of the walls of rotor chamber 26, leaving aside that through the catch nozzle 27, whereas the number of break-throughs according to Fig. 4 would be greater. In this regard the constructional example according to Fig. 5 assumes a median position. There can thus be provided an arrangement according to Fig. 3 with a much better rotor screening than can an arrangement according to Figs. 4 and 5. As the windage loss of the rotor depends upon the extent of this screening, the construction according to Fig. 3 leads to best attainable conditions. Such rotor screening is indicated schematically at 45. The introduction of the additional combustion gas quantity of the extent 41 into the collector chamber 12 occurs between the rotors I and II, that is, viewed in the direction of flow, essentially before the narrowest cross-section 25 of nozzle II (see Fig. 3). Through this narrowest cross-section there thus flow laminarly (i. e., in a smooth, unidirectional stream) approximately 75% of the combustion gases, and thus with the already mentioned minimum nozzle loss.

It is naturally also possible to allow certain deviations in the conditions represented by Figs. 6 and 7. In such cases, it is necessary to resort to the possibilities of the constructional examples of Figs. 4 and 5 and/or of other above-mentioned possible combinations of the described catch nozzles, collector chamber or chambers and methods and arrangements for conveying and charging the combustion gases without departing from the essence of the invention according to which these catch nozzles, collector chamber or chambers and methods and arrangements for conducting the combustion gases have been introduced into explosion chamber technology as new and original measures and constructions.

As a comparison of the course of the drop limiting lines 37 and 38 of Fig. 7 with the course of the corresponding counterpressure lines 42 and 35 of Fig. 6 will show, the formation of an enthalpy drop limiting line is indeed necessary, but is not adequately characterized by the shape of the corresponding pressure curve. For aside from the pressure, the temperature and physical constants (gas constant, adiabatic exponent, etc.) of the combustion gases influence the combustion gas condition which leads to a definite enthalpy drop in reference to another condition. It would thus be theoretically possible to effect a change of the drop limiting lines 37 and 38 in Fig. 7 without changing the pressure of the combustion gases, that is, without changing the counterpressure with reference to the anteriorly arranged nozzle and blading system. As obviously the spirit of the invention is not thereby departed from, the expression "counterpressure" in the subjoined claims and in the foregoing description is always to be understood in this further sense of a line in the Q—V diagram coordinated with the counterpressure.

It will be understood that suitable valve timing and operating mechanism will be provided for opening and closing the various valves at the proper instants. Such timing and operating mechanism can be electrical, mechanical or hydraulic, or combinations of these modes of valve timing and operating. Hydraulic mechanisms of this type have proved particularly suitable for the control of the valves of explosion turbines, various forms of such devices being shown in United States Patent Nos. 1,756,139, 1,763,154, 1,786,946, 1,933,385, 2,010,019, and 2,063,928. As the valve timing and operating mechanism forms no part of the present invention, it has not been deemed necessary to illustrate the same.

We claim:

1. Process for the operation of driving gas generators which comprises charging compressed air and fuel in succession into a plurality of explosion spaces, exploding the ignitable mixture while such explosion spaces are closed, so that combustion gases are generated at a pressure which is a multiple of the charging air pressure, partially expanding the explosion gases and directing them against a turbine blading, collecting the gases exhausting from the latter in a collector space of constant volume during operation, the pressure in said collector space acting as the counterpressure to the said partial expansion, periodically quickly increasing the internal pressure of such collector space, and then causing it to fall relatively gradually for a period which is approximately co-extensive with, and along a line in the Q—V diagram which is approximately parallel to, the period and line, respectively, of the aforesaid partial expansion.

2. Process according to claim 1, wherein the periodic rise and reduction of pressure in the collector space are effected by charging combustion gases of higher pressure than that prevailing in the collector space into a space communicating with collector space, and expanding such higher pressure gases substantially synchronously with the first-mentioned expansion.

3. Process according to claim 1, wherein the periodic rise and reduction of pressure within the collector space are effected by charging thereinto, for expansion therein, pressure gases withdrawn from at least one of the explosion spaces, said gases being withdrawn at an instant in which a gas pressure appears in the explosion space which coincides substantially with the pressure of the explosion gases at the end of their partial expansion.

4. Process according to claim 1, wherein the periodic rise and reduction of pressure are produced immediately within the collector space itself and also in an expansion space communicating with the collector space, and directing gases expanding out of the expansion space into a second blading system.

5. Process for the operation of explosion turbine plants which comprises charging compressed air and fuel in succession into a plurality of explosion spaces, exploding the ignitable mixture while such explosion spaces are closed, so that combustion gases are generated at a pressure which is a multiple of the charging air pressure, discharging and expanding a first portion of the explosion gases of each explosion space and directing them against a turbine blading, catching the gases exhausting therefrom in a collector space, the cycles of the explosion spaces being displaced with reference to each other in predetermined sequence, withdrawing an explosion gas portion of intermediate pressure from a second explosion space, and expanding such portion substantially simultaneously with the flow of said exhaust gases into such collector space to create, after an initial rise of pressure in said collector space, a pressure drop having a characteristic similar to that of the gases in said first turbine stage.

6. Process according to claim 5, wherein the explosion gas portion of intermediate pressure has an initial pressure higher than that existing in the collector space and is charged directly into the collector space substantially simultaneously with the first-mentioned expansion, and directing the mixture of partially de-energized gases from the first turbine stage and live explosion gases of intermediate pressure against a second blading system.

7. Process according to claim 6, wherein substantially simultaneously with the flow into the collector space of gases exhausting from the first turbine and of gases discharging at intermediate pressure from a second explosion space, a portion of the explosion gases of a third explosion space of still lower average pressure, but of a minimum pressure above atmospheric, is charged directly into the exhaust space of the second blading system.

8. Apparatus for generating driving gases by explosion, comprising a plurality of explosion chambers having means for charging air and fuel thereinto and each having a plurality of discharge members for discharging the generated explosion gases in a succession of portions of different pressure ranges, an explosion turbine stage provided with nozzles for receiving the first portion of gases of highest pressure range, a collector chamber arrangement of constant volume in operation disposed on the exhaust side of the explosion turbine stage, and means for creating within the collector chamber arrangement an initial rapid rise of internal pressure followed by a fall of pressure for a period which is approximately co-extensive with that of the expansion of the gases in the explosion turbine stage.

9. Apparatus for generating driving gases by explosion, comprising a plurality of explosion chambers having means for charging air and fuel thereinto and each having a plurality of discharge members for discharging the generated explosion gases in a succession of portions of different pressure ranges, two turbine stages each provided with a nozzle assembly for directing gases against the blading thereof, means for conveying to the nozzle assembly of the first stage the first portion of gases of highest pressure range generated by each explosion, a collector chamber arrangement of constant volume in operation disposed between the turbine stages, and means for creating within the collector chamber arrangement an initial rapid rise of internal pressure followed by a fall of pressure for a period which is approximately co-extensive with that of the expansion of the gases in the first turbine stage, the volume of the collector chamber arrangement being less than about 10% of the volume of all of the explosion chambers associated therewith.

10. Apparatus according to claim 9, wherein the collector chamber arrangement is provided with a catch nozzle assembly for receiving the gases discharging from the first turbine stage.

11. Apparatus according to claim 9, wherein the collector chamber arrangement is provided with a catch nozzle assembly for receiving the gases discharging from the first turbine stage, and terminates at its opposite side in a discharge nozzle assembly.

12. Apparatus according to claim 9, wherein the collector chamber arrangement itself is in direct communication with associated discharge members of the explosion chambers for the discharge of combustion gas portions thereinto.

13. Apparatus according to claim 9, including rotor chambers for housing the rotors of the turbine stages, and wherein the said rotor chambers are attached to the collector chamber arrangement in the combustion gas path and are in direct communication with discharge members of the explosion chambers associated therewith for the discharge of combustion gas portions directly into such rotor chambers.

14. Apparatus according to claim 9, wherein the collector chamber arrangement itself is in direct communication with associated discharge members of the explosion chambers for the discharge of combustion gas portions thereinto, each of said discharge members having a separate conduit leading to the collector chamber arrangement.

15. Apparatus according to claim 9, including rotor chambers for housing the rotors of the turbine stages, and wherein the said rotor chambers are attached to the collector chamber arrangement in the combustion gas path and are in direct communication with discharge members of the explosion chambers associated therewith for the discharge of combustion gas portions directly into such rotor chambers, said apparatus including gas conduit means leading from the discharge members and ending in a nozzle assembly arranged in advance of a blading system behind the collector chamber arrangement.

16. Apparatus according to claim 9, including rotor chambers for housing the rotors of the turbine stages, and wherein the said rotor chambers are attached to the collector chamber arrangement in the combustion gas path and are in direct communication with discharge members of the explosion chambers associated therewith for the discharge of combustion gas portions directly into such rotor chambers, said apparatus including gas conduit means leading from the discharge members and ending in a nozzle assembly arranged in advance of a blading system behind the collector chamber arrangement, said last-named nozzle assembly including a separate, individual nozzle for each discharge member of the associated explosion chambers.

17. Apparatus according to claim 9, including rotor chambers for housing the rotors of the turbine stages, and wherein the said rotor chambers are attached to the collector chamber arrangement in the combustion gas path and are in direct communication with discharge members of the explosion chambers associated therewith for the discharge of combustion gas portions directly into such rotor chambers, said apparatus including gas conduit means leading from the discharge members and ending in a nozzle assembly arranged in advance of a blading system behind the collector chamber arrangement, said gas conduit means comprising separate conduits connected to the associated discharge members and terminating in a common collecting nozzle.

18. Apparatus according to claim 9, wherein the collector chamber arrangement consists of a single chamber arranged to receive the gases discharging from the preceding nozzle and blading system and connected with discharge members of the explosion chambers, and a single discharge nozzle connected with such collector chamber.

19. Apparatus according to claim 9, wherein the narrowest nozzle cross-sections of the nozzle assembly of the second stage are about 1.5 to 3.5 times greater than the narrowest cross-sections of the nozzle assembly of the first turbine stage.

20. Apparatus according to claim 9, wherein the narrowest nozzle cross-sections of the nozzle assembly of the second stage are about 1.5 to 3.5 times greater than the narrowest cross-sections of the nozzle assembly of the first turbine stage.

21. Apparatus for generating driving gases by exposion, comprising a plurality of explosion chambers having means for charging air and fuel thereinto and each having a plurality of discharge members for discharging the generated explosion gases in a succession of portions of different pressure ranges, at least two turbine stages each comprising a rotor and a nozzle assembly in advance of the same, and a collector chamber of constant volume arranged to receive the gases exhausting from the first stage and to conduct them to the nozzle assembly of the second stage, the valves of said chambers being adapted to be operated according to cycles which are displaced from one chamber to the next in predetermined sequence, the discharge members for the highest pressure gas portion of the chambers being connected with the nozzle assembly of the first turbine stage, and at least certain of the discharge members for gas portions of intermediate pressure being connected with the collector chamber, whereby upon charge of gases of highest pressure to the first turbine stage, a gas portion of intermediate pressure is substantially simultaneously charged by another explosion chamber into the collector chamber.

22. Apparatus according to claim 21 wherein discharge members for gas portions of still lower pressure are connected with the exhaust space of the second turbine stage.

23. Apparatus according to claim 8, including a catch nozzle assembly composed of a plurality of separate nozzles for receiving the gases exhausting from the turbine stage, said collector chamber arrangement consisting of a single chamber, said catch nozzles leading into the collector chamber.

24. Apparatus according to claim 8, wherein the collector chamber arrangement receives the gases discharging from the explosion turbine stage, and a plurality of discharge nozzles connected with the collector chamber arrangement to receive the gases therefrom in a plurality of streams.

25. Apparatus according to claim 9, wherein the volume of the collector chamber is from 1 to 5% of the combined volume of the explosion chambers associated therewith.

References Cited in the file of this patent
UNITED STATES PATENTS

| 1,933,385 | Noack | Oct. 31, 1933 |
| 1,988,456 | Lysholm | Jan. 22, 1935 |
| 2,010,823 | Noack | Aug. 13, 1935 |
| 2,603,063 | Ray | July 15, 1952 |